(12) United States Patent
Eguchi et al.

(10) Patent No.: US 9,657,691 B2
(45) Date of Patent: May 23, 2017

(54) CANISTER

(71) Applicant: MAHLE FILTER SYSTEMS JAPAN CORPORATION, Tokyo (JP)

(72) Inventors: Shuichi Eguchi, Tokyo (JP); Junpei Omichi, Kawagoe (JP); Satoshi Seki, Shiki (JP)

(73) Assignee: MAHLE FILTER SYSTEMS JAPAN CORPORATION, Tokyo (JP)

(*) Notice: Subject to any disclaimer, the term of this patent is extended or adjusted under 35 U.S.C. 154(b) by 0 days.

(21) Appl. No.: 14/952,626

(22) Filed: Nov. 25, 2015

(65) Prior Publication Data
US 2016/0169162 A1    Jun. 16, 2016

(30) Foreign Application Priority Data

Dec. 10, 2014 (JP) .................................. 2014-249476

(51) Int. Cl.
*B01D 53/04* (2006.01)
*F02M 25/08* (2006.01)

(52) U.S. Cl.
CPC ..... *F02M 25/0854* (2013.01); *B01D 53/0415* (2013.01); *B01D 53/0438* (2013.01); *B01D 2253/102* (2013.01); *B01D 2257/702* (2013.01); *B01D 2259/4516* (2013.01); *B01D 2259/4566* (2013.01); *F02M 2025/0881* (2013.01)

(58) Field of Classification Search
CPC ............ B01D 53/0415; B01D 53/0438; B01D 2253/102; B01D 2257/702; B01D 2259/4516; B01D 2259/4566; F02M 25/0881; F02M 25/0854

USPC .............. 95/146; 96/132, 133, 146; 123/519
See application file for complete search history.

(56) References Cited

U.S. PATENT DOCUMENTS

| | | | |
|---|---|---|---|
| 6,769,415 B2* | 8/2004 | Reddy ................ | F02M 25/0854 123/519 |
| 2005/0014642 A1* | 1/2005 | Oi ........................... | B01J 20/20 502/416 |
| 2012/0186563 A1* | 7/2012 | Hasegawa .......... | B01D 53/0415 123/519 |
| 2013/0263740 A1* | 10/2013 | Mani .................. | B01D 53/0407 96/112 |
| 2013/0263741 A1* | 10/2013 | Mani .................. | F02M 25/0854 96/112 |

(Continued)

FOREIGN PATENT DOCUMENTS

| JP | 61-118956 U | 7/1986 |
|---|---|---|
| JP | 2013-249797 A | 12/2013 |

*Primary Examiner* — Frank Lawrence
(74) *Attorney, Agent, or Firm* — Foley & Lardner LLP

(57) ABSTRACT

A canister has a housing whose one end is provided with a charge port and a purge port and whose other end is provided with a drain port and a heater. The housing is divided into a no-heat-application section on a charge port and purge port side and a heat-application section on a drain port side. The heat-application section is further divided into at least two spaces of a first space located on the drain port side and a second space located on a no-heat-application section side. The first space is filled with an activated carbon whose BWC is equal to or greater than 6 g/dL and less than 10 g/dL, and the second space is filled with an activated carbon whose BWC is 13 g/dL or greater. The heater heats whole of the heat-application section including the first space and the second space.

4 Claims, 5 Drawing Sheets

(56) References Cited

U.S. PATENT DOCUMENTS

2015/0275727 A1* 10/2015 Hiltzik .............. B01D 53/0415
                                                              123/519

* cited by examiner

CANISTER

BACKGROUND OF THE INVENTION

The present invention relates to a canister used for an evaporative fuel treatment device of a vehicle, and more particularly to a canister whose DBL (Diurnal Breathing Loss) performance is improved.

As a well-known technique, in order to prevent evaporated fuel (or evaporative fuel) in a fuel tank from being released into the atmosphere, a vehicle using an internal combustion engine is provided with an evaporative fuel treatment device having, as a main body, a canister.

With respect to the canister, an adsorbent such as an activated carbon fills an inside of a casing of the canister. The canister has the function of adsorbing, by the adsorbent, the evaporated fuel generated from the fuel tank in a halt state of the internal combustion engine, and desorbing (purging) a fuel component from the adsorbent and introducing it into an intake system of the engine by the atmospheric air introduced from a drain port at engine start-up or in an engine operating state.

Japanese Unexamined Patent Application No. 2013-249797 (hereinafter is referred to as "JP2013-249797") and Japanese Unexamined Utility Model Application No. 61-118956 (hereinafter is referred to as "JP61-118956") disclose a structure of canister in which in order to promote the desorption of the adsorbed fuel component, a heater to heat the adsorbent is provided at the canister using the adsorbent. Especially in JP2013-249797, in order to reduce an amount of the fuel component adsorbed to the adsorbent provided close to the drain port, heating value by the heater is given such gradient that temperature in a position close to the drain port is higher than temperature at purge port side of the canister when applying heat by the heater. As for JP61-118956, it discloses that an activated carbon is heated to 40° C.~100° C.

SUMMARY OF THE INVENTION

Emission requirement (or emission control) for the internal combustion engine of the vehicle tends to be stricter year after year, and higher DBL performance is required of the canister of the evaporative fuel treatment device. Here, a DBL test is a test that, assuming that the vehicle is parked for a long time, like around-the-clock parking, measures an amount of the fuel component emitted or released from the canister with change in outside air temperature during the parking.

On the other hand, in a case of hybrid vehicle in which the internal combustion engine temporarily works, the number of occasion of purging the canister tends to be reduced, and also a usable amount of gas (a usable introduced air amount) for the purge tends to be reduced. Thus, conditions required of the canister are increasingly strict.

In such various conditions required of the canister, the related art canister provided with the heater as disclosed in JP2013-249797 and JP61-118956 cannot necessarily obtain adequate performance, and there is still room for improvement in canister. For instance, in the case of the canister disclosed in JP2013-249797 in which the temperature at the drain port side is set to be higher, due to the fact that temperature of the activated carbon is excessively high, absorbing performance around the drain port is decreased by contraries, as disclosed in JP61-118956. In this case, for instance, in the DBL test, relatively dilute (or lean) fuel vapor tends to be released from the drain port. Further, although JP61-118956 discloses that it is desirable that the activated carbon should be heated to less than 100° C., it is impossible for the activated carbon having a certain capacity (or volume) to be heated uniformly by the heater. For instance, a part contiguous or adjacent to the heater becomes a high temperature locally. Therefore, the decrease in the absorbing performance partly necessarily occurs.

The present invention was made in view of the above technical problem. An object of the present invention is therefore to provide a canister having an excellent absorbing performance.

According to one aspect of the present invention, a canister comprises: a housing whose one end, which is one end side of a flow direction, is provided with a charge port and purge port and whose other end, which is the other end side of the flow direction, is provided with a drain port, the housing being divided into a no-heat-application section on a charge port and purge port side and a heat-application section on a drain port side, the heat-application section being further divided into at least two spaces of a first space located on the drain port side and a second space located on a no-heat-application section side, and the first space being filled with an activated carbon whose butane working capacity is equal to or greater than 6 g/dL and less than 10 g/dL and the second space being filled with an activated carbon whose butane working capacity is 13 g/dL or greater; and a heater which heats whole of the heat-application section including the first space and the second space.

According to the present invention, by providing the heat-application section on a drain port side of the canister and providing the activated carbon whose butane working capacity is equal to or greater than 6 g/dL and less than 10 g/dL and the activated carbon whose butane working capacity is 13 g/dL or greater in the heat-application section, a high DBL performance can be obtained.

The other objects and features of this invention will become understood from the following description with reference to the accompanying drawings.

DETAILED DESCRIPTION OF THE INVENTION

Embodiments of the present invention will be explained below with reference to the drawings.

Figure 1:
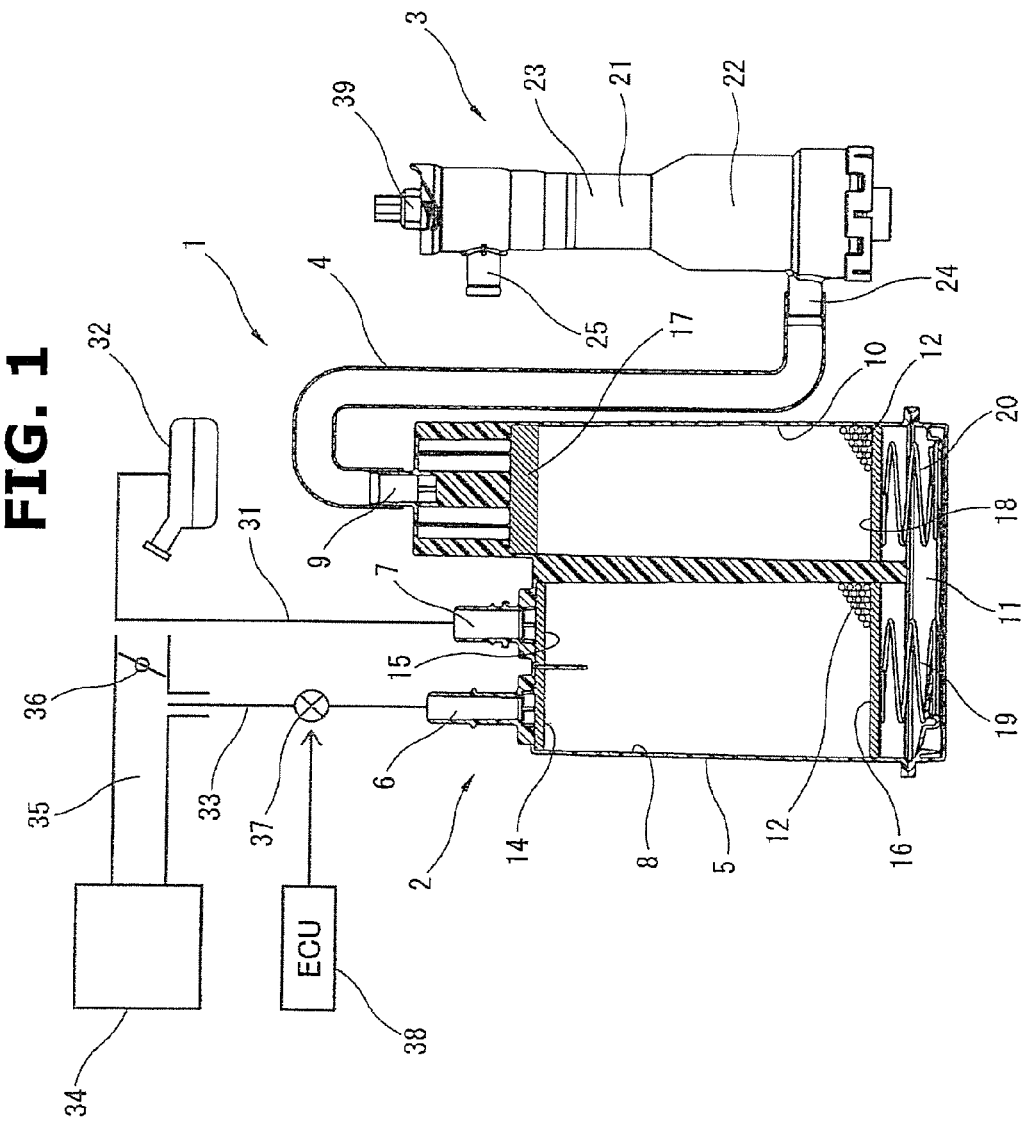
FIG. 1 is a schematic system diagram showing the whole configuration of a canister according to an embodiment of the present invention.

FIG. 1 shows a canister 1 as a schematic system of an evaporative fuel treatment device according to the present invention. The canister 1 temporarily holding or accumulating a fuel component has a relatively large capacity main canister 2 that is a no-heat-application unit or section and a relatively small capacity buffer canister 3 that is a heat-application unit or section. The main canister 2 and the buffer canister 3 are connected to each other via a flexible tube 4.

The main canister 2 has a housing 5 made of synthetic resin. This housing 5 has a narrow rectangular first tubular section 8 having at one end thereof a purge port 6 and a charge port 7, which are adjacent to each other, and a narrow rectangular second tubular section 10 having at one end thereof a connecting port 9. These first and second tubular sections 8 and 10 are located and fixedly connected to each other with the first and second tubular sections 8 and 10 adjacent to each other through a slight gap. The other end of the first tubular section 8 and the other end of the second tubular section 10 communicate with each other via a connecting passage 11. With this structure, a U-shaped continuing inside space, i.e. a U-shaped continuing inside passage, is formed in the housing 5.

The first tubular section 8 and the second tubular section 10 are each filled with a granular activated carbon 12 as an adsorbent which can adsorb and desorb the fuel component (e.g. gasoline vapor). More specifically, a porous screen member 14 and a porous screen member 15, which separate off the first tubular section 8 from the purge port 6 and from the charge port 7 respectively, are set at one end portion of the first tubular section 8. Also, a porous screen member 16, which separates off the first tubular section 8 from the connecting passage 11, is set at the other end portion of the first tubular section 8. The activated carbon 12 fills a space between these porous screen members 14, 15 and porous screen member 16. Likewise, porous screen members 17 and 18 are set at both end portions of the second tubular section 10, and the activated carbon 12 fills a space between these porous screen members 17 and 18. Here, the porous screen members 16 and 18, disposed at the connecting passage 11 side, of the first and second tubular sections 8 and 10 are supported by the respective perforated plates (not shown). The perforated plates are forced by springs 19 and 20 that are provided in a compression state, then the activated carbon 12 is properly compressed.

In the present invention, the adsorbent used for the main canister 2 is not particularly limited, and any kind of adsorbent can be used. As an example, a common activated carbon 12 whose BWC (Butane Working Capacity) is 11.0 g/dL is used. Further, activated carbons having mutually different properties could be used for the first tubular section 8 and the second tubular section 10 respectively. Here, a volume of the space, filled with the activated carbon 12, of the main canister 2 is, for instance, 2300 cc.

On the other hand, the buffer canister 3 has a separately-provided housing 21 made of synthetic resin. This housing 21 is a substantially cylindrical in shape by connection in series of a large diameter section 22 having a relatively large diameter and a small diameter section 23 having a relatively small diameter. The large diameter section 22 is provided, at an end side surface thereof, with a connecting port 24. The small diameter section 23 is provided, at an end side surface thereof, with a drain port 25. The connecting port 24 of the buffer canister 3 is connected to the connecting port 9 of the main canister 2 via the flexible tube 4.

Therefore, as the whole of the canister 1, three inside spaces of the first tubular section 8, the second tubular section 10 and the buffer canister 3 are substantially connected in series so as to form one flow passage from the purge port 6 and the charge port 7 that are a flow passage one end to the drain port 25 that is a flow passage other end.

The charge port 7 is connected to a head space of a fuel tank 32 of a vehicle via a charge passage 31, while the purge port 6 is connected to an intake passage 35 (more specifically, to a downstream side of a throttle valve 36) of an internal combustion engine 34 via a purge passage 33. The purge passage 33 is provided with a purge control valve 37, and opening of the purge control valve 37 is controlled by an engine control unit 38. The drain port 25 is a port that is opened to the atmosphere. However, an electromagnetic valve 39 is provided at an end portion of the buffer canister 3 so as to intercept the opening to the atmosphere by the drain port 25 as necessary.

Figure 2:
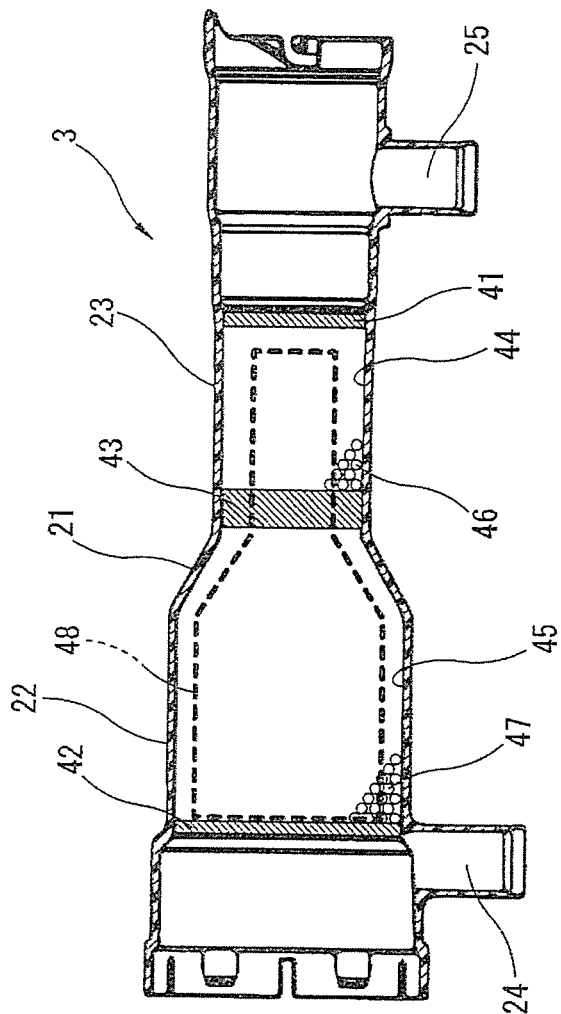
FIG. 2 is a sectional view of a buffer canister of the embodiment of the present invention.

FIG. 2 shows an inside structure of the buffer canister 3 that is the heat-application unit or section. An inside space of the buffer canister 3 is partitioned off into two areas (or spaces) 44 and 45 by a porous screen member 41 provided at an end portion on the small diameter section 23 side, a porous screen member 42 provided at an end portion on the large diameter section 22 side and a porous screen member 43 provided at a middle portion of the buffer canister 3. Then, the first space 44 located on the drain port 25 side is filled with a first granular activated carbon 46, while the second space 45 located on the connecting port 24 side is filled with a second granular activated carbon 47. Further, an electric heater 48 that is a heat application unit is disposed and extends over both of the first and second spaces 44 and 45 in the buffer canister 3. This electric heater 48 penetrates the porous screen member 43 located at the middle portion of the buffer canister 3, and is buried in the activated carbons 46 and 47 filling the first and second spaces 44 and 45.

Here, as the first activated carbon 46 filling the first space 44 located on the drain port 25 side, an activated carbon whose BWC is equal to or greater than 6 g/dL and less than 10 g/dL is used. For instance, an activated carbon whose BWC is 8.0 g/dL is used. This activated carbon is an activated carbon whose pore distribution is controlled so that, for instance, a proportion of pore (macroporous) having a relatively large pore diameter is high.

As the second activated carbon 47 filling the second space 45 located on the connecting port 24 side, i.e. on the main canister 2 side, an activated carbon whose BWC is 13 g/dL or greater is used. For instance, an activated carbon whose BWC is 15.3 g/dL is used. This activated carbon is, for instance, a common activated carbon whose proportion of the macroporous is not particularly controlled.

Here, as an example, a volume of the first space 44 is 40 cc, and a volume of the second space 45 is 160 cc.

In the canister 1 configured as explained above, the three of the first tubular section 8, the second tubular section 10 and the buffer canister 3 are substantially connected in series and form the one flow passage. And the purge port 6 and the charge port 7 are located at one end in a flow direction of the flow passage, while the drain port 25 is located at the other end in the flow direction of the flow passage. As is obvious to anyone skilled in the art, fuel vapor generated in the fuel tank 32 in a halt state of the vehicle or during refueling is introduced into the canister 1 through the charge port 7. Then, during flow of the fuel vapor from the first tubular section 8 to the first space 44 of the buffer canister 3, the fuel vapor is adsorbed by each of the activated carbons 12, 46 and 47. Fuel component of the fuel vapor adsorbed in this manner is desorbed (purged) from the activated carbons 12, 46 and 47 with the atmospheric air introduced from drain port 25 by a negative pressure generated in an intake system of the engine in an engine operating state, and flows, as a purge gas, into the intake passage 35 of the internal combustion engine 34 from the purge port 6, then finally is burned in the engine 34.

The canister 1 repeats the adsorption and the desorption of the evaporated fuel (the fuel vapor) in this manner. In the canister 1, in order to promote the desorption of the adsorbed fuel component in the engine operating state, the inside space of the buffer canister 3 is heated by the electric heater 48. This heat application is done so that an average temperature (or a mean temperature) of the first activated carbon 46 and the second activated carbon 47 is less than 100° C., preferably 50° C.~90° C. If the activated carbon is heated and its temperature is 100° C. or higher, hydrocarbon component that stabilizes and exists on a pore surface etc. of the activated carbon is also desorbed, then moisture (water) is adsorbed instead. As a result, absorbing performance for the fuel component deteriorates. By heating the activated carbon within a range of 50° C.~90° C., the desorption of the fuel component is promoted while preventing such phenomenon. Here, it is desirable to start energization of the electric heater 48 immediately after an ignition key is turned ON. Further, it could be possible to stop the energization of the electric heater 48 after some period of operation of the internal combustion engine 34 (in other words, after some period of purge of the adsorbed fuel component). Also, the energization of the electric heater 48 could be continued during travel of the vehicle.

In the DBL test, after the purge is done in some measure by the travel of the vehicle, the vehicle is in a stopped state for a long time, for instance, one-day to three-day stop, then an amount of the fuel component (an amount of so-called minute breakthrough) released from the drain port 25 with change in outside air temperature during the vehicle stopped state is tested or evaluated. In the case of the canister 1, since only the relatively small capacity buffer canister 3 added to a rear stage of the main canister 2 (i.e. the drain port 25 side) is heated by the electric heater 48, DBL performance is effectively improved by small power. Especially in the present embodiment, since the buffer canister 3 as the heat-application unit or section is enclosed with the separately-provided housing 21, only the activated carbons 46 and 47 in the buffer canister 3 can be efficiently heated.

Figure 3:
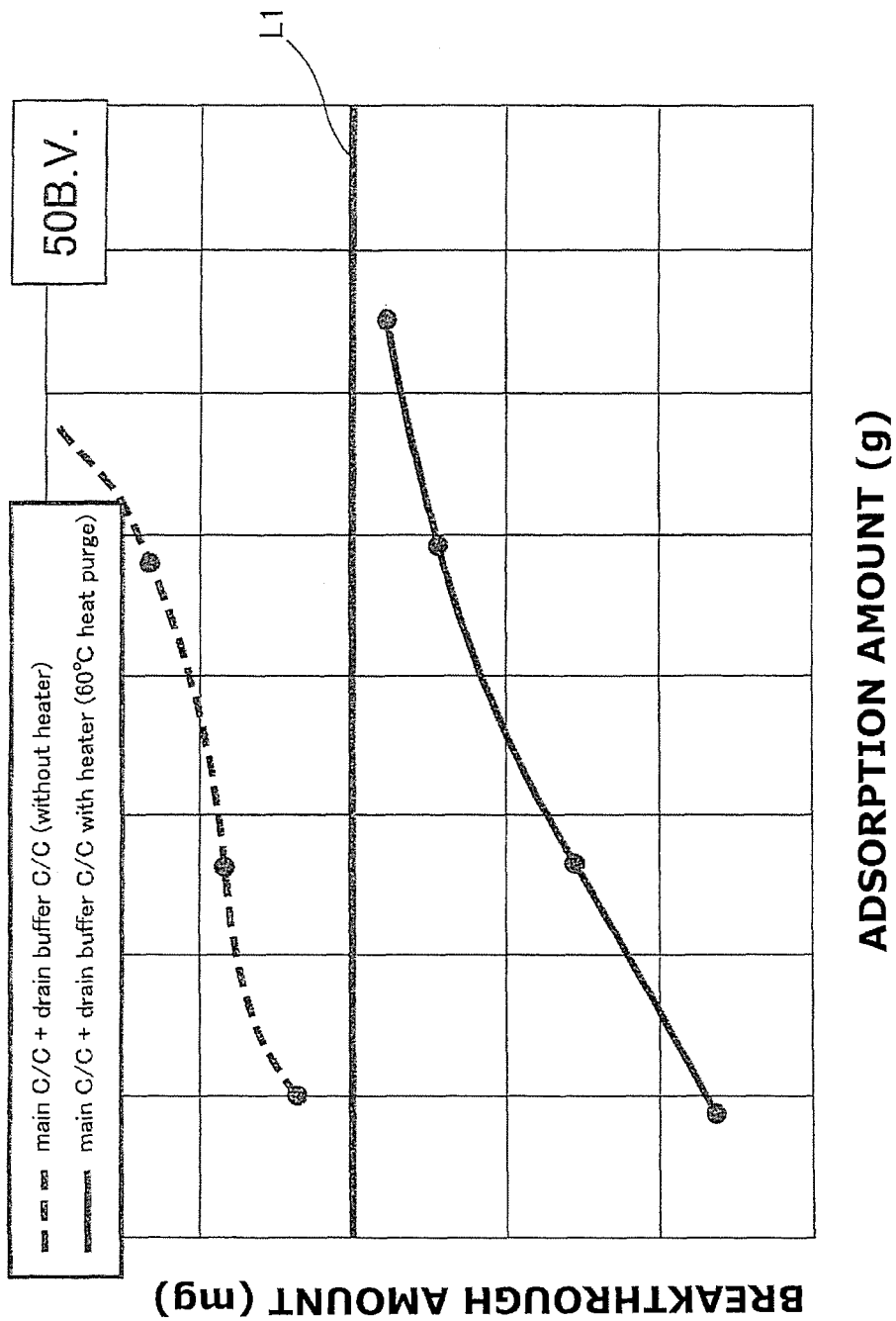
FIG. 3 is a plot showing a relationship between an adsorption amount and a breakthrough amount of the canister, of a case of the presence or absence of 60° C. heat application, in a DBL test.

FIG. 3 is a graph showing a difference of the DBL performance according to the presence or absence of the heat application. The DBL test was done along a common DBL test as follows. After the canister 1 adsorbs the fuel vapor up to a breakthrough state, the purge is done by an amount of the air 50 times the volume (or the capacity) of all activated carbons of the canister 1 (i.e. 50 bed volume) introduced and flowing from the drain port 25. Afterwards, an amount of the minute breakthrough of the fuel component released from the drain port 25 is measured each day of 3-day test, and a relationship between an adsorption amount after the purge (with an adsorption amount when the purge is ended being set to 0) and the measured amount of the breakthrough is plotted. Here, the adsorption amount of the canister 1 gradually increases day by day due to repeat of temperature change in 3 days.

A line L1 is a target breakthrough amount. In FIG. 3, a solid line indicates characteristics of a case where the heat application to 60° C. is done by the electric heater 48 upon execution of the purge in the canister 1 configured as explained above in the present embodiment. A broken line is a comparative example, which indicates characteristics of a case where no heat application is done.

As indicated by the broken line, in the case where no heat application is done, even immediately after the purge, the amount of the minute breakthrough is large, and this does not meet the target value L1. This means that in the case where no heat application is done, sufficient purge cannot be done by such a small amount of the 50 bed volume air.

In contrast to this, in the case of the present embodiment indicated by the solid line, since the desorption of the fuel component in the second space 45 and the first space 44 on the drain port 25 side in the buffer canister 3 is promoted by the heat application using the electric heater 48, the minute breakthrough in the DBL test is suppressed even by the purge by such a small amount of the 50 bed volume air.

Here, even if the whole of the canister 1, including the main canister 2, is heated, a large decrease of the breakthrough amount is not shown in spite of an increase of power consumption, although this is not shown in the plot. That is, when the fuel component having remained in the main canister 2 gradually diffuses or spreads and moves to the drain port 25 side then finally reaches the drain port 25, the minute breakthrough occurs. Since the diffusing and moving fuel component is gradually adsorbed by the activated carbon 12 in the main canister 2 and the activated carbons 47 and 46 in the buffer canister 3, a high effect can be obtained by the heat application of the small capacity buffer canister 3, as the DBL performance. In particular, since the second activated carbon 47 in the second space 45, located at a relatively upstream side of the diffusion and movement of the fuel component in the buffer canister 3, has a high BWC, adequate adsorption of the fuel component is done before the fuel component reaches the first space 44.

Further, as described above, since the fuel component is gradually adsorbed in the main canister 2 and the buffer canister 3, the fuel vapor existing in a space close to the drain port 25 is a highly dilute (or lean) fuel vapor. In the light of this lean fuel vapor, the first activated carbon 46 filling the first space 44 located on the drain port 25 side has excellent adsorption properties of the lean fuel vapor as compared with the second activated carbon 47 in the second space 45. Therefore, by providing and setting the relatively small capacity first activated carbon 46 at a downstream side with respect to the second space 45 in a flow direction toward the drain port 25, it is possible to effectively adsorb the lean fuel vapor that passes through the second space 45.

Furthermore, in the case of the heat application using the electric heater 48, even when trying to heat the first activated carbon 46 and the second activated carbon 47 within the range of 50° C.~90° C. as mentioned above, the activated carbon, a part of which is adjacent to or touching the electric heater 48 and is locally heated to 100° C. or higher, necessarily exists. In such a case where the activated carbon (a part of the activated carbon) is excessively heated, moisture adsorption properties of the first activated carbon 46 are lower than those of the second activated carbon 47. Thanks to this, even when also the hydrocarbon component having stabilized on the activated carbon is desorbed due to the excessive heat application, absorbing performance for the lean fuel vapor does not deteriorate. That is to say, even though the first activated carbon 46 having the excessively high temperature inevitably exists locally, the absorbing performance for the lean fuel vapor can be stably obtained, it is therefore possible to ensure the adsorption of the lean fuel vapor in the space close to the drain port 25 during the parking.

Accordingly, by combining the first activated carbon 46 and the second activated carbon 47 as explained above in the present embodiment, a high DBL performance can be obtained.

Figure 4:
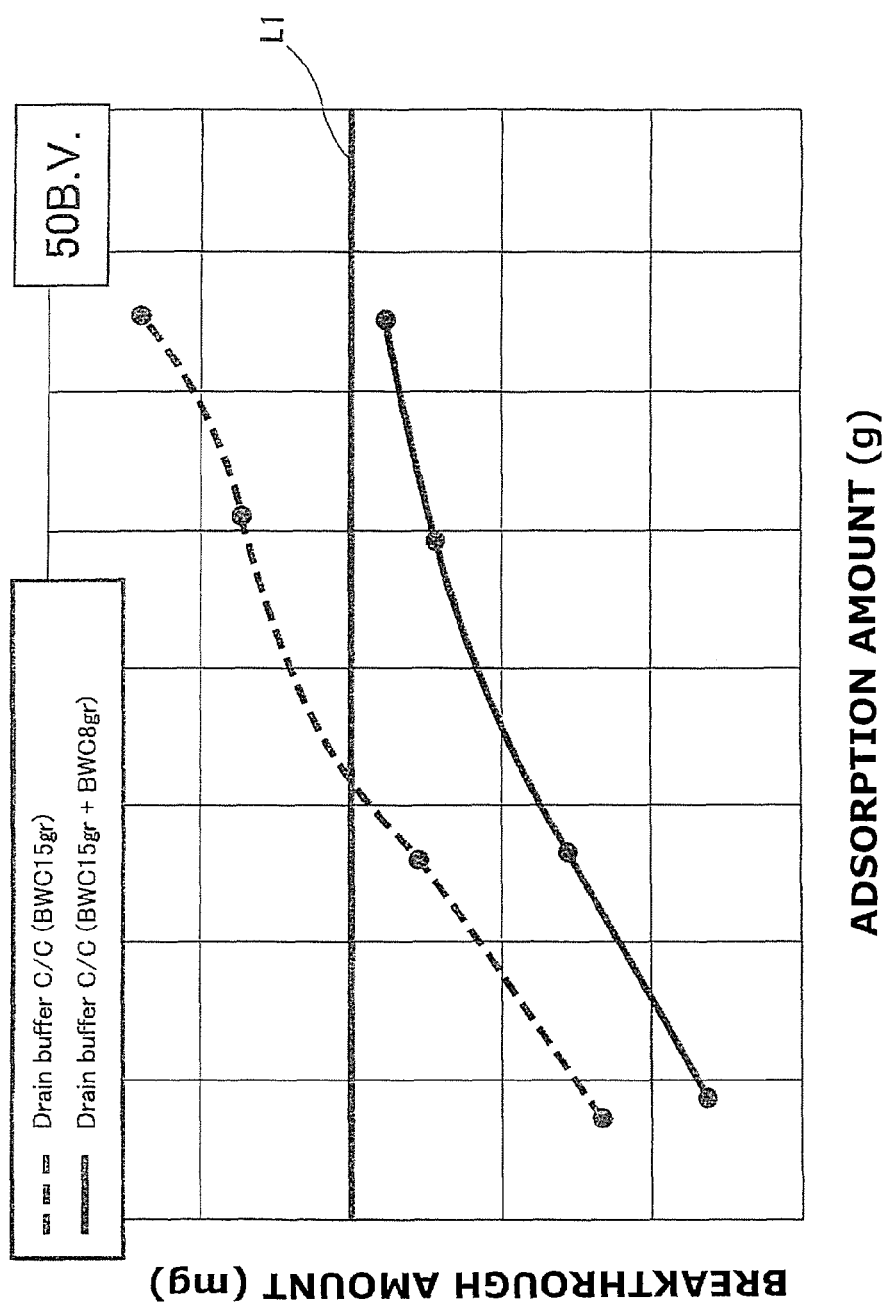
FIG. 4 is a plot showing a relationship between the adsorption amount and the breakthrough amount of the canister, of a case where combination of activated carbon is different, in the DBL test.

FIG. 4 is a plot showing a relationship between the amount of the minute breakthrough of the fuel component released from the drain port 25, measured each day of 3-day test, and the adsorption amount after the purge, which is the same as FIG. 3 described above. A solid line indicates characteristics of a case of the above embodiment, i.e. a case where the first activated carbon 46 and the second activated carbon 47 are combined. A broken line is a comparative example, which indicates characteristics of a case where both of the first and second spaces 44 and 45 of the buffer canister 3 are filled with the second activated carbon 47. Here, in both these cases, the heat application to 60° C. was done by the electric heater 48. Also, in the same manner as FIG. 3, the purge in the DBL test was done by the amount of the 50 bed volume air. As can be seen in FIG. 4, by combining the first activated carbon 46 and the second activated carbon 47, a high DBL performance can be obtained.

Figure 5:
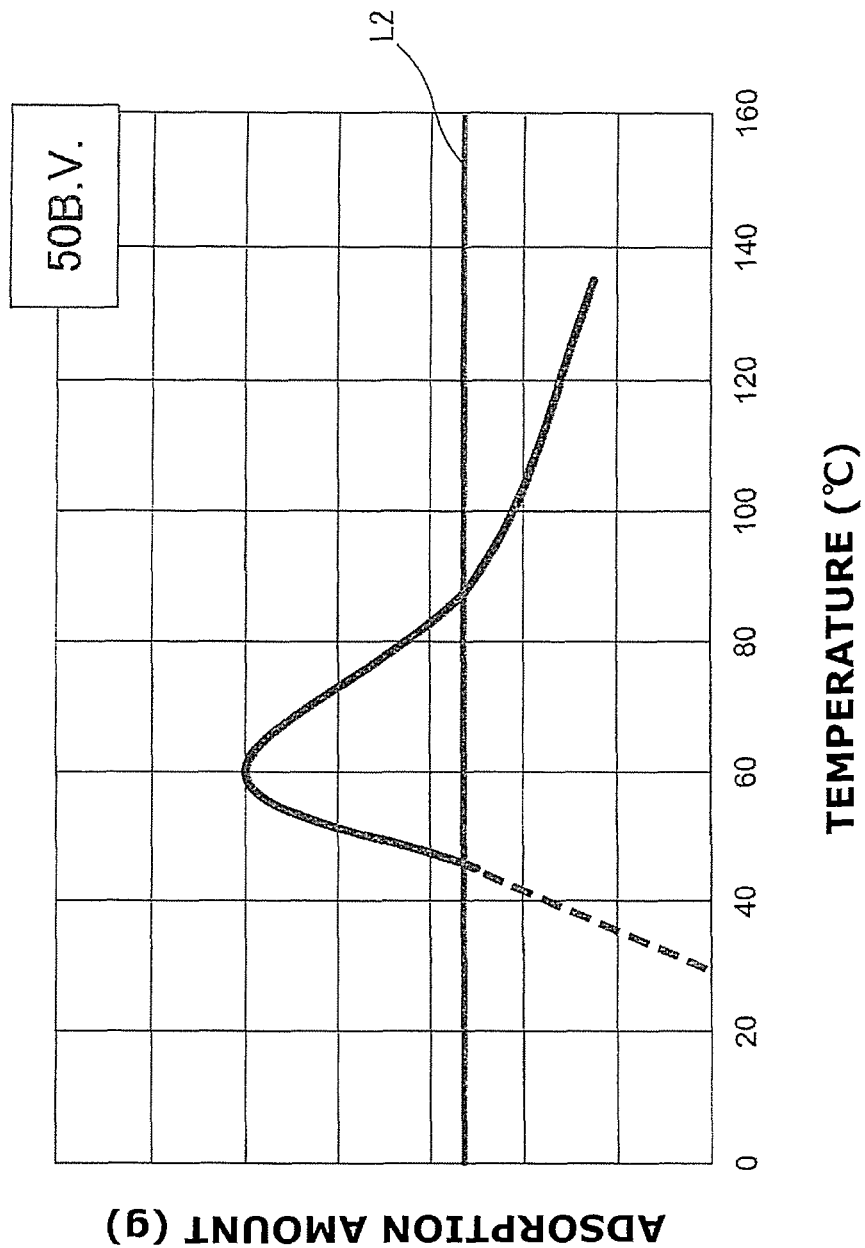
FIG. 5 is a plot showing a relationship between the adsorption amount and a heat temperature at a time of the breakthrough.

Next, FIG. 5 shows a relationship between the adsorption amount after the purge (which corresponds to a horizontal axis of FIGS. 3 and 4) when the minute breakthrough amount in the DBL test exceeds the target breakthrough amount (which corresponds to L1 in FIGS. 3 and 4) and a heat application temperature by the electric heater 48. Here, also in this case, the purge in the DBL test was done by the amount of the 50 bed volume air. As can be seen in FIG. 5, in a case where the first activated carbon 46 and the second activated carbon 47 in the buffer canister 3 are heated to approximately 60° C., the largest adsorption amount can be obtained. That is, this means that the purge is done most effectively and the minute breakthrough in the DBL test can be suppressed. In FIG. 5, a line L2 is a target value of the adsorption amount after the purge. To meet this target value L2, heat application of 50° C.~90° C. is required. Here, in a low temperature region indicated by a broken line, also as explained in FIG. 3, the amount of the minute breakthrough exceeds the target value L1 from a time immediately after the purge. Hence, in the present invention, it is desirable that the heat application of 50° C.~90° C. should be done by the electric heater 48. In particular, it is highly desirable to heat the activated carbon to 60° C.

Next, effects obtained by the present invention will be explained.

According to the present embodiment, the heat-application unit (the buffer canister 3) having the heater 48 is located on the drain port 25 side with respect to the no-heat-application unit (the main canister 2). Therefore, upon the purge, the fuel component adsorbed in the heat-application unit (the buffer canister 3) is actively desorbed. For instance, in the DBL test, although the fuel component having remained in the no-heat-application unit (the main canister 2) gradually diffuses or spreads and moves to the drain port 25 side during the vehicle stopped state, most of them are adsorbed in the heat-application unit (the buffer canister 3). By locally heating only the heat-application unit (the buffer canister 3) on the drain port 25 side, it is possible to effectively suppress the release of the fuel component, i.e. the minute breakthrough, from the drain port 25 during the vehicle stopped state by relatively small amount of heat (in other words, by relatively small power).

The diffusing and moving fuel component (mainly, butane) in the vehicle stopped state is gradually adsorbed while moving toward the drain port 25. Thus, as the fuel vapor approaches the drain port 25, concentration of the fuel vapor is gradually dilute or lean. Here, when comparing the activated carbon, filling the first space 44, whose BWC is equal to or greater than 6 g/dL and less than 10 g/dL and the activated carbon, filling the second space 45, whose BWC is 13 g/dL or greater, the former activated carbon is superior in the absorbing performance for the lean fuel vapor to the latter activated carbon. It is therefore possible to effectively adsorb the lean fuel vapor in the first space 44 located on the drain port 25 side, and to suppress the minute breakthrough of the lean fuel vapor.

Further, since the moisture adsorption properties of the former activated carbon are lower than those of the latter activated carbon, even when also the hydrocarbon component having stabilized on the activated carbon is desorbed due to the excessive heat application, the absorbing performance for the lean fuel vapor does not deteriorate. That is to say, when heating the activated carbon by the heater 48, even though the activated carbon having the excessively high temperature inevitably exists locally, the absorbing performance for the lean fuel vapor can be stably obtained. It is therefore possible to ensure the adsorption of the lean fuel vapor in the space close to the drain port 25 during the parking.

In the present invention, the activated carbon in the heat-application unit (the buffer canister 3) is heated to less than 100° C., preferably to 50° C.~90° C., by the heater 48.

By heating the activated carbon to such temperature, not only the desorption of the adsorbed fuel component can be promoted, but also the adsorption of the moisture to the activated carbon, caused by the excessive heat application, can be prevented. Thus, the deterioration of the absorbing performance for the fuel component, due to the moisture adsorption, can be prevented.

As one desirable configuration, a first housing (the main canister 2) as the no-heat-application section and a second housing (the buffer canister 3) as the heat-application section are separately provided. With this configuration, since the no-heat-application section and the heat-application section are certainly separated from each other, it is possible to effectively heat the inside of the buffer canister 3 by the heater 48.

Here, BWC of the activated carbon in the present invention is a value based on ASTM D5228.

Although the present invention has been explained by reference to the above embodiment, the present invention is not limited to the above. For instance, in the above embodiment, the no-heat-application unit and the heat-application unit of the canister are separately configured as the main canister 2 and the buffer canister 3 respectively. However, the no-heat-application unit and the heat-application unit could be provided in one housing. Further, as the heat-application section, three spaces or more could be provided. In this case, the first space filled with the activated carbon whose BWC is 6 g/dL~10 g/dL is positioned at drain port side relatively with respect to the second space filled with the activated carbon whose BWC is 13 g/dL or greater.

The entire contents of Japanese Patent Application No. 2014-249476 filed on Dec. 10, 2014 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A canister comprising:
   a housing whose one end, which is one end side of a flow direction, is provided with a charge port and a purge port and whose other end, which is the other end side of the flow direction, is provided with a drain port, the housing being divided into a no-heat-application section on a charge port and purge port side and a heat-application section on a drain port side, the heat-application section being further divided into at least two spaces of a first space located on the drain port side and a second space located on a no-heat-application section side, and the first space being filled with an activated carbon whose butane working capacity is equal to or greater than 6 g/dL and less than 10 g/dL and the second space being filled with an activated carbon whose butane working capacity is 13 g/dL or greater; and a heater which heats whole of the heat-application section including the first space and the second space.

2. The canister as claimed in claim 1, wherein:

the heater heats the activated carbon in the heat-application section to less than 100° C.

3. The canister as claimed in claim 2, wherein:

the heater heats the activated carbon in the heat-application section to 50° C.~90° C.

4. The canister as claimed in claim 1, wherein:

the housing has a first housing that forms a main canister as the no-heat-application section and a second housing that forms a buffer canister as the heat-application section, with the first and second housings separately provided.

* * * * *